(12) United States Patent
Lindenlaub et al.

(10) Patent No.: US 8,255,350 B2
(45) Date of Patent: Aug. 28, 2012

(54) INSTANTIATING A SOLUTION USING PRECONFIGURED TEMPLATES

(75) Inventors: Ralf Lindenlaub, Roswell, GA (US); Vasu Chandrasekhara, Heidelberg (DE); Andreas Eberhart, Bruchsal (DE); Bernd Herth, Cuperino, CA (US); Stefan Kraus, Rauenberg (DE); Ulrich Walther, Wiesloch (DE)

(73) Assignee: SAP AG, Walldorf (DE)

( * ) Notice: Subject to any disclaimer, the term of this patent is extended or adjusted under 35 U.S.C. 154(b) by 876 days.

(21) Appl. No.: 12/347,633

(22) Filed: Dec. 31, 2008

(65) Prior Publication Data

US 2010/0169261 A1 Jul. 1, 2010

(51) Int. Cl.
*G06F 17/00* (2006.01)
*G06N 5/02* (2006.01)
(52) U.S. Cl. .......................................................... 706/47
(58) Field of Classification Search ........................ None
See application file for complete search history.

(56) References Cited

U.S. PATENT DOCUMENTS

| 6,704,873 | B1 * | 3/2004 | Underwood ..................... 726/12 |
| 2010/0049851 | A1 * | 2/2010 | Garrison et al. ............. 709/226 |
| 2010/0107163 | A1 * | 4/2010 | Lee | |

OTHER PUBLICATIONS

'Optimize your Development and Test Lab with Virtualization' [online]. VMware, 2007, [retrieved on Jul. 2, 2009]. Retrieved from the Internet: <URL: http://web/archive.org/web/20071009122555/ http://www.vmware.com/products/labmanager/>, 3 pages.

'SAP Best Practices Preconfigured Business Expertise' [online]. SAP AG, 2005, [retrieved on Jul. 2, 2009]. Retrieved from the Internet: <URL: http://www.myplick.com/view/7V5GO11t4Lq/ SAP-Best-Practices-overview-V5-BLLA-EN>, 28 pages.

* cited by examiner

*Primary Examiner* — Alan Chen
*Assistant Examiner* — Li-Wu Chang
(74) *Attorney, Agent, or Firm* — Fish & Richardson P.C.

(57) ABSTRACT

Among other disclosed subject matter, a system for instantiating at least one solution includes a plurality of preconfigured templates representing operating systems and business systems and comprising preconfigured system images and data images, each of the preconfigured templates adapted for use in instantiating an instantiation system in any of multiple pools isolated from each other. The system includes an infrastructure service for customizing and configuring the instantiation system in one of the pools as instantiated using any of the preconfigured templates. The system includes a virtualization allocator that allocates the instantiation system to a selection from among physical servers and virtual servers.

18 Claims, 6 Drawing Sheets

INSTANTIATING A SOLUTION USING PRECONFIGURED TEMPLATES

TECHNICAL FIELD

This document relates to instantiating one or more solutions in isolated pools.

BACKGROUND

Instantiation of solutions is associated with challenges and unique circumstances presented by individual customers. A number of preparative tasks are sometimes performed for prototyping a solution, which in some aspects can be similar to those of a hosting service provider. For example, a secure infrastructure lab environment is sometimes set up, which can consist of a network, servers and access gateways. Operating system and applications are provided, and storage and backup areas furnished. System events must be handled and may be monitored, and the lifecycle of the lab must be managed. For example, at the end of the lifecycle it may be necessary to archive or transfer contents to a customer.

SUMMARY

The invention relates to instantiating a solution.

In a first aspect, a system for instantiating at least one solution includes a plurality of preconfigured templates representing operating systems and business systems and comprising preconfigured system images and data images, each of the preconfigured templates adapted for use in instantiating an instantiation system in any of multiple pools isolated from each other. The system includes an infrastructure service for customizing and configuring the instantiation system in one of the pools as instantiated using any of the preconfigured templates. The system includes a virtualization allocator that allocates the instantiation system to a selection from among physical servers and virtual servers.

Implementations can include any or all of the following features. The preconfigured templates can include portions of configuration information applying to respective ones of multiple layers in the instantiation system. The system can further include a configuration agent that manages naming and address ranges. The virtualization allocator can be configured for changing the selection between the physical servers and virtual servers for the instantiation system. The selection can initially be all physical and the virtualization allocator can change the selection so that the instantiation system is allocated to at least one of the virtual servers, without reconfigurating the instantiation system. The system can perform oversubscription of at least one resource. The oversubscription can include that an instantiation system feature is written once and used by multiple customers assigned to individual pools. The resource can include a first disk and the system can generate a second disk for one of the multiple customers by creating a pointer to the first disk, and only changed data can be stored for the second disk. The system can further include a workflow engine configured to encapsulate and automate common administrative tasks across instantiation systems in the multiple pools. The system can further include a user interface that provides role-based web-enabled access. The system can further include an appliance component configured to support maintenance tasks for instantiation systems in the multiple pools, including patch management and update management. The physical servers can include multiple hardware frames, and the virtualization allocator can distribute at least two of the multiple pools across the multiple hardware frames in multiple of the virtual servers. The infrastructure service can make network-based identifications for the instantiation system using the preconfigured template. The system can further include an access gateway that enables a connection from outside the system to any of the multiple pools independently of the other pools. The instantiation system can include at least one selected from: a prototype system; a hosted system; and combinations thereof.

In a second aspect, a computer-implemented method for instantiating a solution includes instantiating a system using a preconfigured template comprising a preconfigured system image and a data image, the preconfigured template adapted for use in-system instantiation in any of multiple pools isolated from each other. The method includes customizing and configuring the system in one of the pools. The method includes allocating and mapping the system to a selection from among physical servers and virtual servers.

Implementations can include any or all of the following features. The method can further include instantiating and managing multiple systems independently in the multiple pools. Managing the systems can include maintaining a workflow for common administrative tasks of the systems. The systems can be managed through a user interface that provides role-based web-enabled access.

In a third aspect, a computer program product is tangibly embodied in a computer-readable storage medium and includes instructions that when executed by a processor perform a method for instantiating a solution. The method includes instantiating a system using a preconfigured template comprising a preconfigured system image and a data image, the preconfigured template adapted for use in-system instantiation in any of multiple pools isolated from each other. The method includes customizing and configuring the system in one of the pools. The method includes allocating and mapping the system to a selection from among physical servers and virtual servers.

Implementations can provide any or all of the following advantages. Solution hosting can be provided by instantiating a solution using am arbitrary combination of virtual and physical resources. A prototyping lab can be created that provides a "one-stop" user interface for configuring all underlying hardware, network resources and services. Multiple customers can engage in prototyping in separate isolated pools that can rely on shared system resources through oversubscription. Prototyping can be made more productive, with less setup time and with more flexibility.

The details of one or more embodiments are set forth in the accompanying drawings and the description below. Other features and advantages will be apparent from the description and drawings, and from the claims.

DETAILED DESCRIPTION

Figure 1:
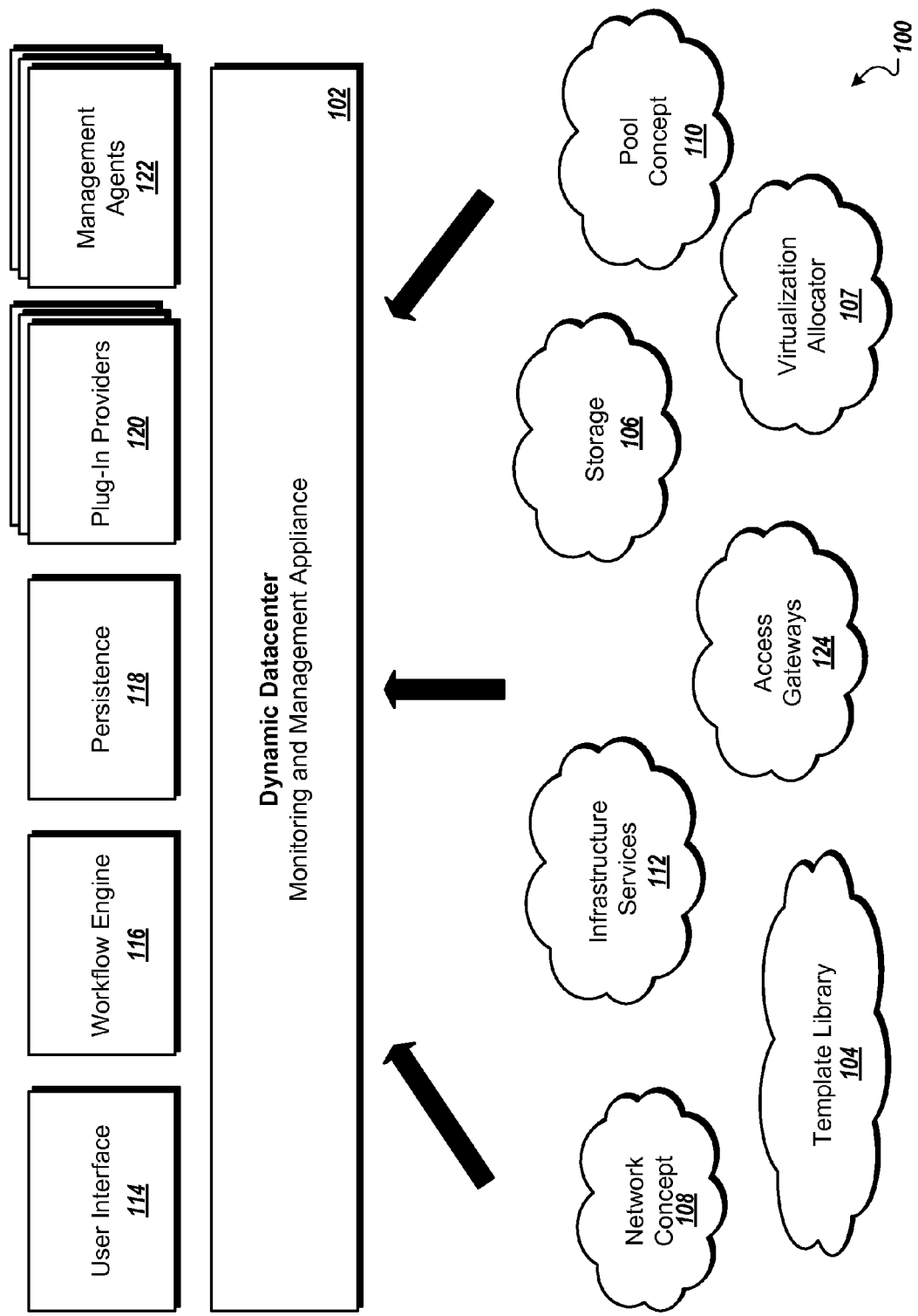
FIG. 1 shows an example of a system including a dynamic datacenter.

FIG. 1 schematically shows an example of a system 100 including a dynamic datacenter 102. The system 100 can be used as an effective tool in allowing customers to instantiate solutions, such as to prototype systems or host solutions in a flexible way and with efficient reuse of resources when possible. One component that provides such flexibility and efficiency is the datacenter 102, which can include an appliance (e.g., a software structure) that monitors and manages components and information in the system 100. In some implementations, the datacenter 102 can provide a prototyping environment where all underlying hardware, network and services can be automatically configured, such as using specialized providers, for prototyping by multiple customers. For example, the system 100 can provide a heterogeneous datacenter approach where customer secure zones (pools) can be created ad-hoc by configuring off-the-shelf standard components and where compute entities can be instantiated by pre-manufactured standard templates. In some implementations, the system 100 can be used to provide an advantageous approach for hosting computer resources, such as to host an entire system landscape.

The datacenter 102 relies on a template library 104 that contains one or more preconfigured templates. In some implementations, the templates can correspond to standard operating systems and/or system components, such as any of those available from SAP AG, that can be instantiated on the fly. For example, the templates can include preconfigured system images and or attachable data images. In some implementations, the templates can include startup services, for example for negotiating network identity and connectivity regarding one or more components.

The system 100 provides for storage 106 to maintain components and data for the system(s) to be prototyped and/or hosted. In some implementations, a flexible combination of virtual and physical servers can be used. For example, storage virtualization can be used in tandem with a virtualization allocator 107 responsible for assigning virtual/physical storage for a particular prototype system. Such allocation can provide increased ability to adapt the solution, for example as needs change, and can allow for efficient reuse of resources in the system 100. For example, a particular prototype or hosted system can have allocated thereto one or more virtual servers, physical servers, or combinations thereof.

A network concept 108 is included in the system 100. In some implementations, the network concept 108 provides that separate pools can be created in the storage 106 for respective customers, for example across multiple hardware components. For example, VLAN switching techniques can be used to define isolated customer pools across more than one switch.

A pool concept 110 provides separability and independence for implemented customer systems. For example, a pool for a first customer can include a particular operating system and a certain software component, and a pool for a second customer can be created to run independently and in isolation from the first pool. In some implementations, a pool can be used in creating one or more other pools.

The system 100 includes infrastructure services 112. In some implementations, the infrastructure services 112 provide automatic customization and configuration of a prototype or hosted solution that is instantiated using a template. In such implementations, the infrastructure services 112 can provide that infrastructure aspects such as naming conventions, IP address ranges and gateway assignments are followed by the one or more computer nodes in each system. As an example, if a template having a particular SID is to be instantiated twice in the same pool, the infrastructure service can provide an application-specific SID-change procedure.

One or more user interfaces 114 are included in the system. In some implementations, the user interface 114 can form a "one-stop" user interface for configuring all underlying hardware, network resources and services, such as for running a prototyping lab. The user interface can provide role-based web-enabled access for landscape administrators to monitor and manage prototyping or hosting activities. For example, the user interface 114 can interact with the datacenter 102, for example to select a template from the template library 104 and instantiate the template in a pool for a particular customer.

A workflow engine 116 can be included in the system 100. In some implementations, the workflow engine 116 can encapsulate and automate common administrative tasks to be performed across several system components and/or in separate customer pools.

Persistence 118 is provided in the system 100, for example to ensure fault-tolerant operations in case components are temporarily down or unreachable. For example, the storage 106 can provide persistence using the available virtual/physical servers.

The system 100 includes one or more plug-in providers 120. In some implementations, the plug-in provider 120 can mediate between the internal system implemented as a prototype and the vendor-specific formats and protocols, and provide an open software development kit, for example so that other hardware can be integrated in the system.

The system 100 can include one or more management agents 122. In some implementations, the management agent 122 can provide uniform and secure management access across network boundaries, for example in multiple customer pools.

One or more access gateways 124 can be included in the system 100. In some implementations, the access gateway can allow customer access to one or more pools. For example virtual desktop and/or VPN connections can be provided.

In some implementations, the datacenter 102 can provide significant reduction in the time necessary for implementing a prototype and/or hosted system. For example, an instantiation that if performed separately could take hours or days to complete, may be possible to instantiate in a matter of seconds or minutes.

Other advantages can be achieved. For example, the virtualization allocator 107 can flexibly allocate and map the system between virtual server(s) and physical server(s). For example, after a prototype or hosted system is instantiated using one or more physical servers, the virtualization allocator can selectively shift the system to an allocation that includes an arbitrary degree of virtualization. In some implementations, the virtualization allocator 107 can gradually shift the system from an all-physical instantiation to an all-virtual instantiation.

Server and storage virtualization can allow resources to be oversubscribed to some extent. For example, memory and/or CPU oversubscription can be performed in the system 100. In some implementations, oversubscription can be provided using a hypervisor, for example facilitated through transient virtual machines, page sharing, swap files and a VMware balloon driver. Features such as snapshots, block links, clones and/or de-duplication can be used to achieve one or more "write-once-use-many" scenarios.

Figure 2:
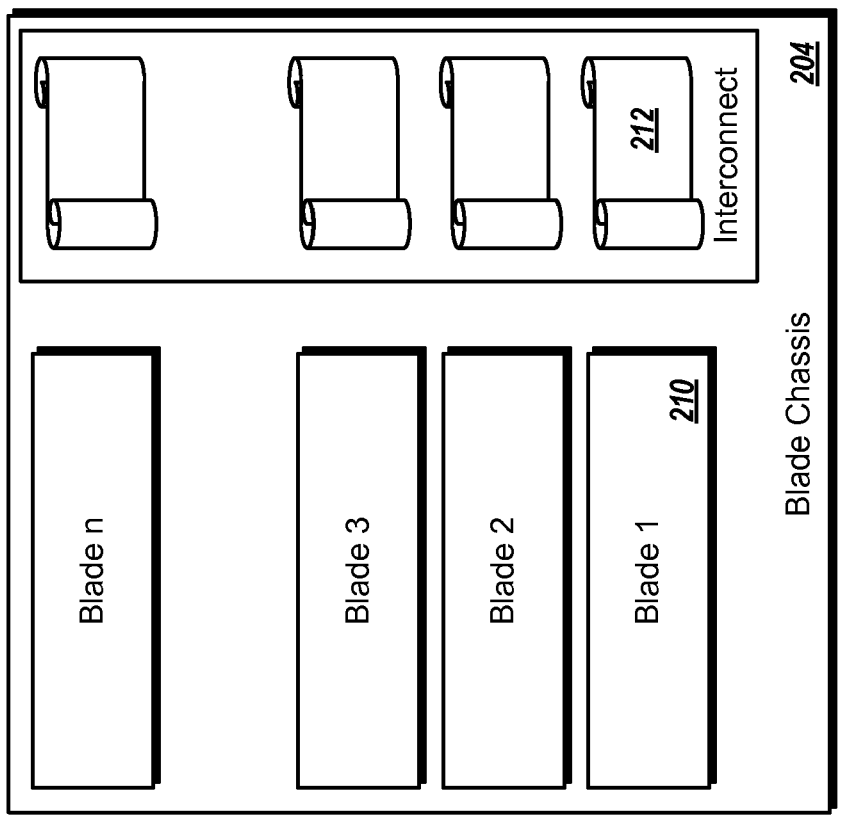
FIG. 2 shows example virtual and blade servers.
Figure 2:
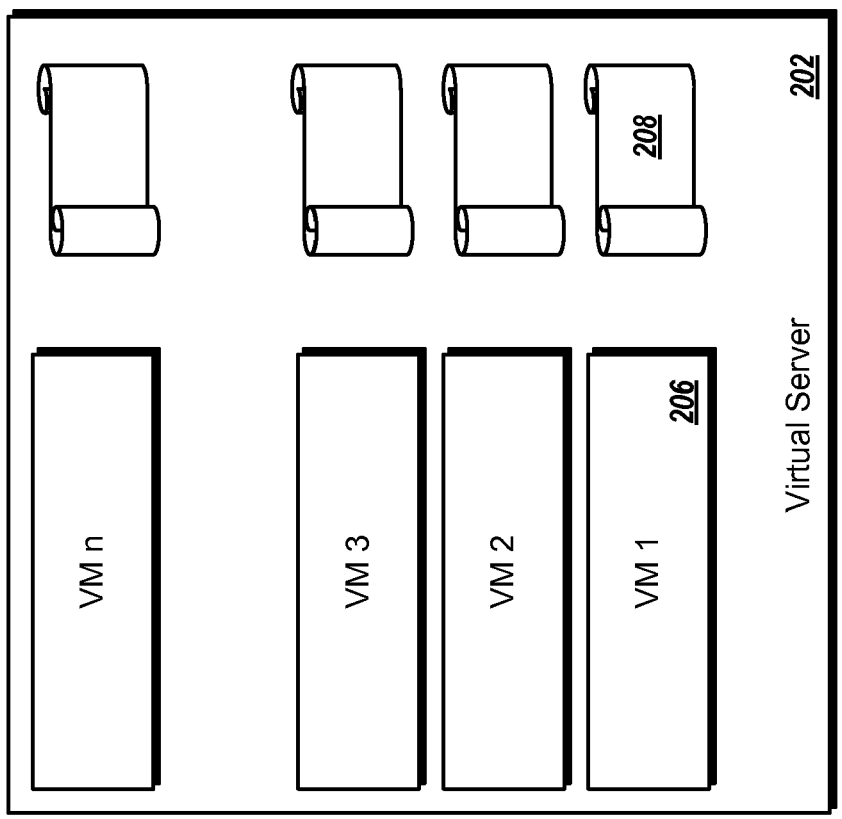

FIG. 2 shows example virtual and blade servers 200. Here, a virtual server 202 and a blade chassis 204 can be used for one or more customer systems. For example, the virtual server 202 can include any number of virtual machines (VM) 206. Each VM 206 can be associated with one or more configuration files 208. In some implementations, the configuration file 208 can include information about programmatically setting all hardware identities such as system UUIDs, Ethernet MAC addresses, iSCSI IQNs or FiberChannel WWNN, which can allow reallocations to be performed without readjusting application configurations. The blade chassis 204 can include any number of blades 210. Each blade 210 can be associated with an interconnect configuration file 212, for example to maintain information regarding MACs, network and storage disks attachment.

In some implementations, the servers 200 can handle multiple computing platforms. For example, such platforms can include, but are not limited to: VMWare, Xen, Egenera bladeframe, HP cClass blade system, IBM blade frame, HP Superdome, HP Integrity VMs and Flexframe.

Figure 3:
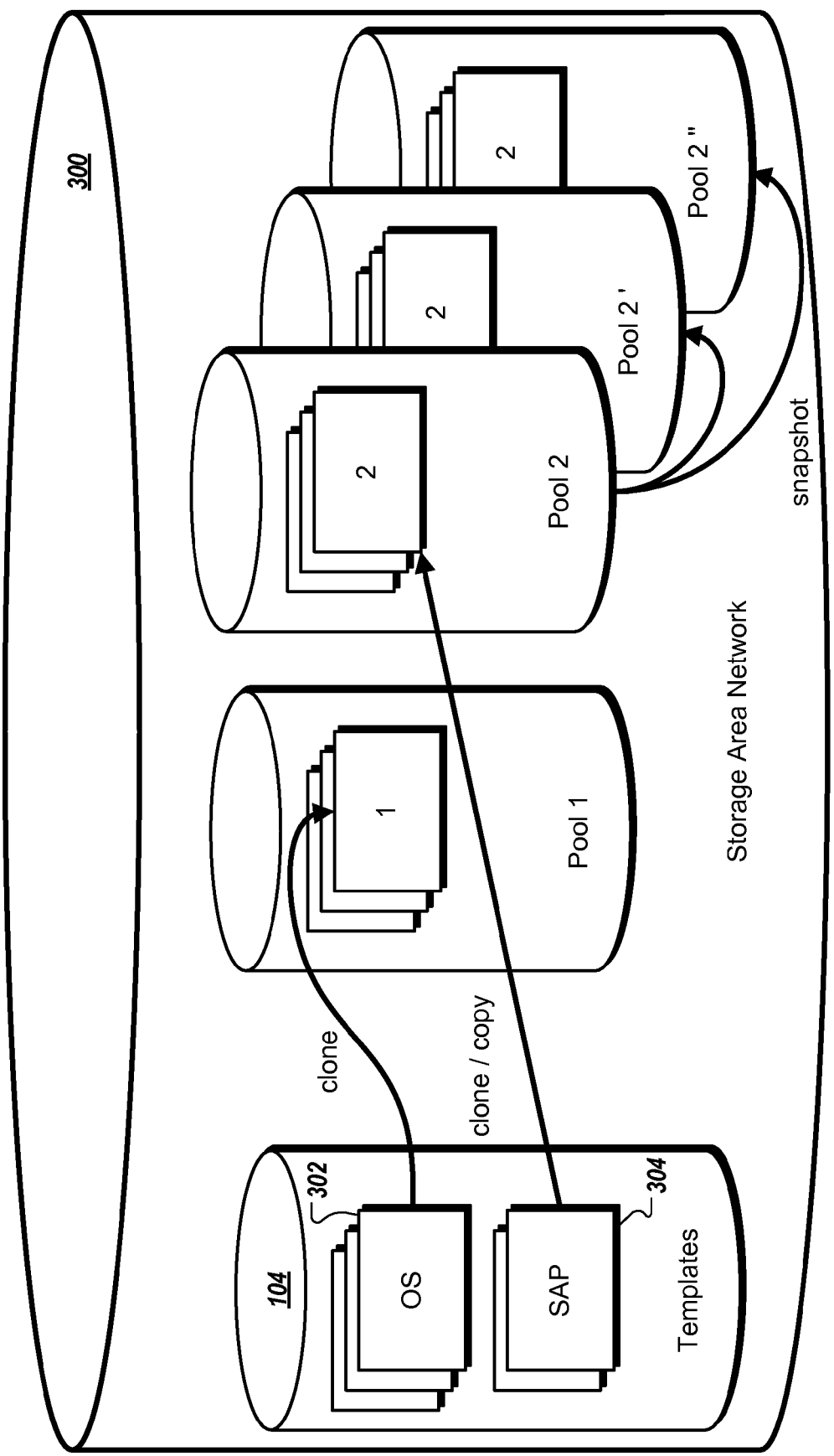
FIG. 3 shows an example storage area network including prototype systems implemented in pools.

FIG. 3 shows an example storage area network 300 including prototype systems implemented in pools. The template library 104 can include multiple preconfigured templates: one or more operating system templates 302 and/or one or more component templates 304, such as a component of an SAP system or a system from any other manufacturer.

A pool 1 can be created, including cloning one of the operating system templates 302 and instantiating it as an operating system in the pool. A pool 2 can be created, including cloning or copying one of the component templates 304 into a component in the pool. For example, the preconfigured templates can include system and/or data images that can be used in the cloning/copying. More than one system or component can be instantiated in a pool. A new pool can be created from an existing pool. For example, a pool 2' and a pool 2" can be created by taking snapshots of the pool 2. In some implementations, a pointer to a first disk can be created to generate a second disk for another customer, for example such that of the data for the second disk only that different from the data pertaining to the first disk is actually stored.

Figure 4:
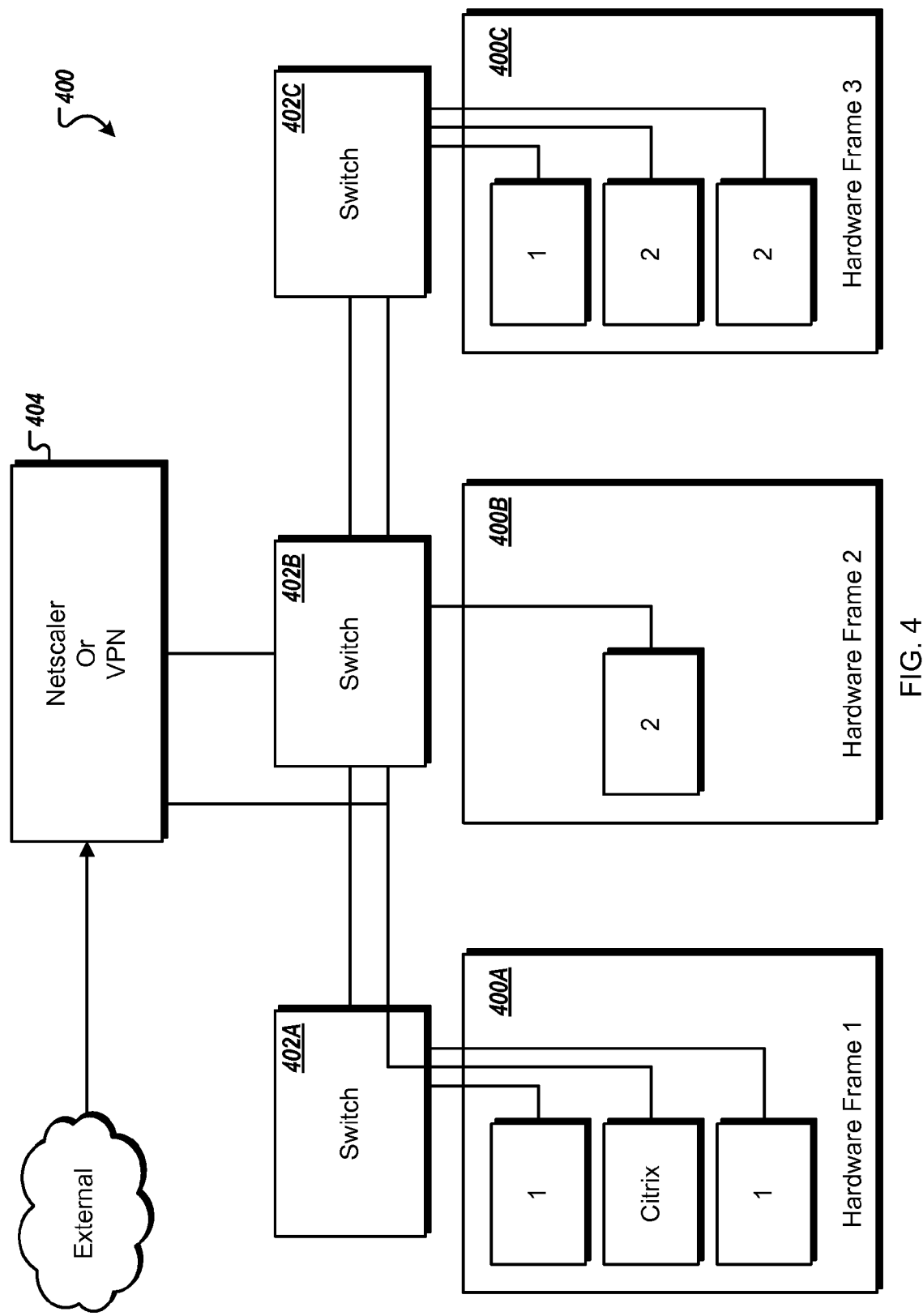
FIG. 4 shows example customer pools distributed over hardware frames.

FIG. 4 shows example customer pools distributed over hardware frames 400. Here, the hardware frames include first, second and third hardware frames 400A-C, respectively. A first customer pool is distributed across the hardware frames in components labeled "1". Similarly, second customer pool is distributed across the hardware frames in components labeled "2". Accordingly, securely separated pools are created that can cross borders of switches 402A-C. A netscaler or VPN 404 can be used for providing external access to any component in the hardware frames 400, for example using the access gateway 124 (FIG. 1). In some implementations, the VPN connection transparently maps client's network into the pool. As another example, a desktop session access to a preconfigured Citrix server (or similar server) can be used to provide access. Accordingly, the access gateway 124 can be aware of and linked to users and pools available in the datacenter 102 (FIG. 1). As another example, web dispatching functionalities can be embedded in the access gateway 124 to allow for https (and/or other protocol, if needed) connectivity to exposed and secured service(s) in a pool.

Figure 5:
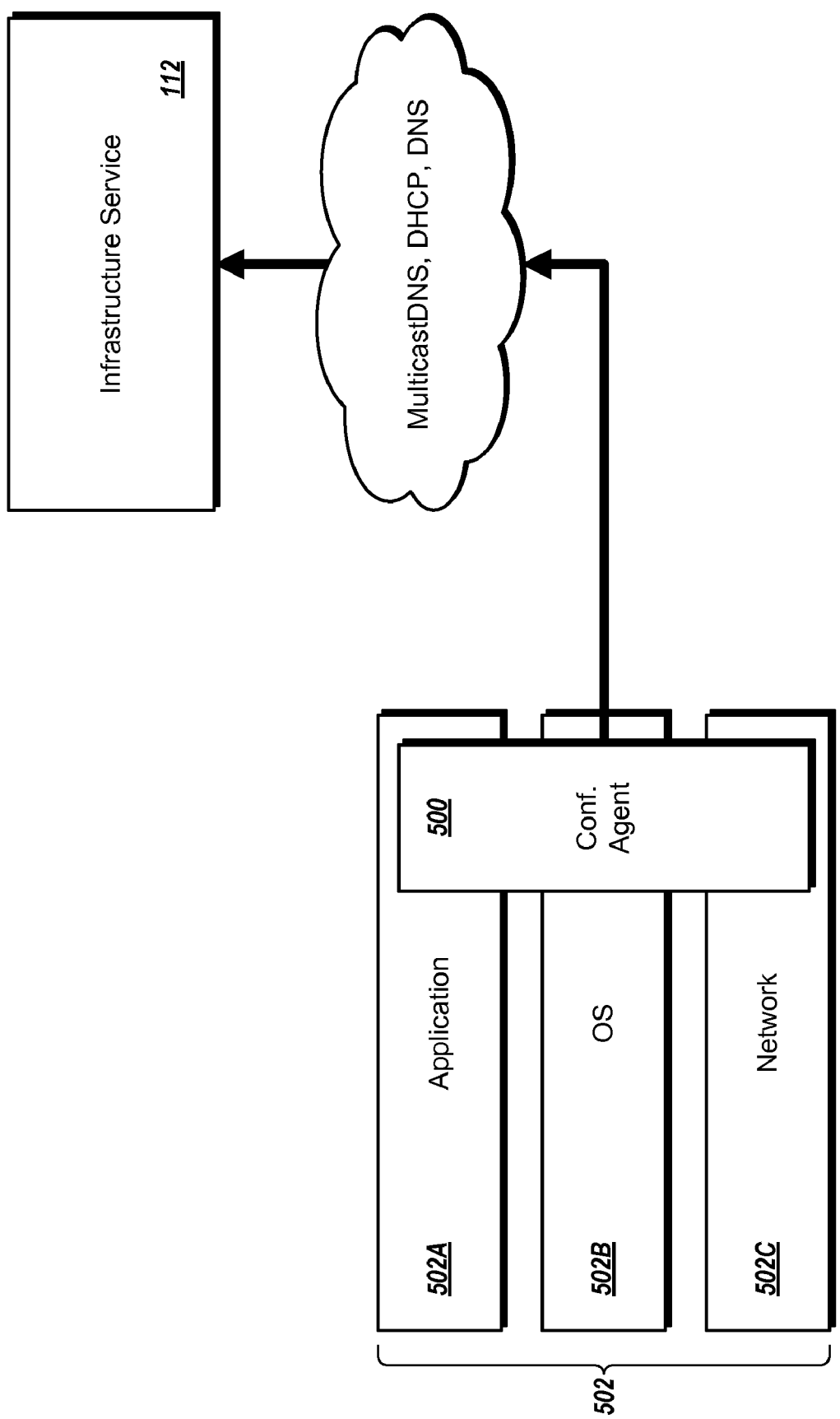
FIG. 5 shows an example configuration agent applied to layers of a prototype system.

FIG. 5 shows an example configuration agent 500 applied to layers of a prototype system 502. Here, the prototype system 502 includes at least an application layer 502A, an operating system layer 502B and a network layer 502C. For example, the configuration agent 500 can provide that infrastructure aspects such as naming conventions and IP address ranges are strictly followed in the pool where the prototype system 502. In some implementations, DNS services 504 can serve alias, local and external names, which can allow for template default names to remain valid within a pool also with duplicate instantiations. For example, the DNS service 504 can operate in connection with one or more of the infrastructure services 112.

Figure 6:
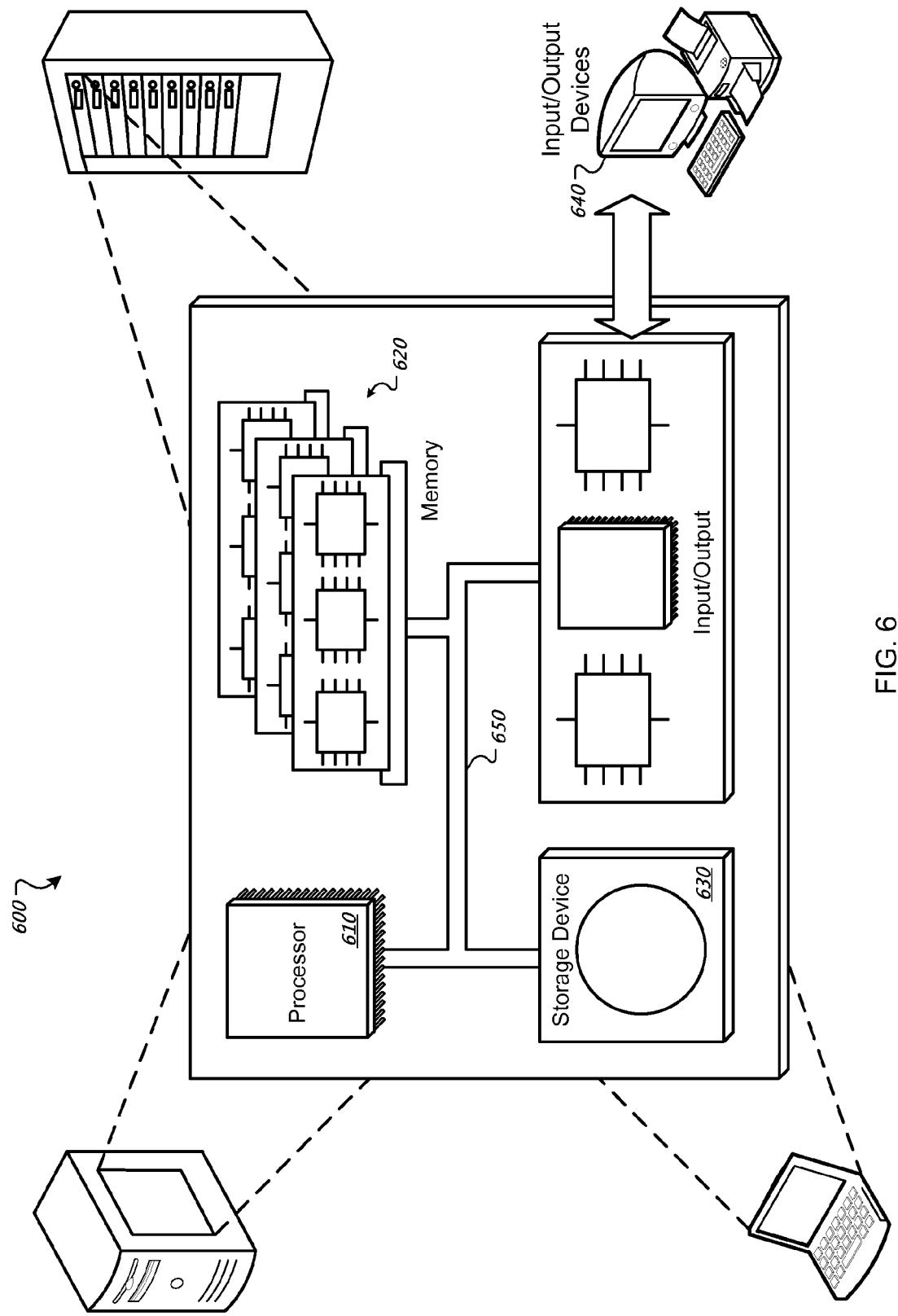
FIG. 6 is a block diagram of a computing system that can be used in connection with computer-implemented methods described in this document.

In some implementations, the agent 500 can be applied to a hosted system instead of, or in addition to, the prototype system 502, FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A system for instantiating at least one solution, the system comprising:
   a plurality of preconfigured templates representing operating systems and business systems and comprising preconfigured system images and data images, each of the preconfigured templates adapted for use in instantiating an instantiation system in any of multiple pools isolated from each other;
   one or more processors; and
   a computer program product tangibly embodied in a computer-readable storage medium and comprising instructions that when executed generate:
      an infrastructure service for customizing and configuring the instantiation system in one of the pools as instantiated using any of the preconfigured templates;
      a virtualization allocator that allocates the instantiation system to a selection from among physical servers and virtual servers; and
      a configuration agent that manages naming and address ranges;
   wherein the preconfigured templates comprise portions of configuration information applying to respective ones of multiple layers in the instantiation system.

2. The system of claim 1, wherein the virtualization allocator is configured for changing the selection between the physical servers and virtual servers for the instantiation system.

3. The system of claim 2, wherein the selection is initially all physical and wherein the virtualization allocator changes the selection so that the instantiation system is allocated to at least one of the virtual servers, without reconfigurating the instantiation system.

4. The system of claim 1, wherein the system performs oversubscription of at least one resource.

5. The system of claim 4, wherein the oversubscription comprises that an instantiation system feature is written once and used by multiple customers assigned to individual pools.

6. The system of claim 5, wherein the resource comprises a first disk and the system generates a second disk for one of the multiple customers by creating a pointer to the first disk, and wherein only changed data is stored for the second disk.

7. The system of claim 1, further comprising a workflow engine configured to encapsulate and automate common administrative tasks across instantiation systems in the multiple pools.

8. The system of claim 1, further comprising a user interface that provides role-based web-enabled access.

9. The system of claim 1, further comprising an appliance component configured to support maintenance tasks for instantiation systems in the multiple pools, including patch management and update management.

10. The system of claim 1, wherein the physical servers comprise multiple hardware frames, and wherein the virtualization allocator distributes at least two of the multiple pools across the multiple hardware frames in multiple of the virtual servers.

11. The system of claim 1, wherein the infrastructure service makes network-based identifications for the instantiation system using the preconfigured template.

12. The system of claim 1, further comprising an access gateway that enables a connection from outside the system to any of the multiple pools independently of the other pools.

13. The system of claim 1, wherein the instantiation system includes at least one selected from:
   a prototype system;
   a hosted system; and
   combinations thereof.

14. A computer-implemented method for instantiating a solution, the method comprising:
   instantiating a system using a preconfigured template comprising a preconfigured system image and a data image, the preconfigured template adapted for use in system instantiation in any of multiple pools isolated from each other, wherein naming and address ranges are managed by a configuration agent, and wherein the preconfigured template comprises configuration information applying to respective ones of multiple layers in the system;
   customizing and configuring the system in one of the pools; and
   allocating and mapping the system to a selection from among physical servers and virtual servers.

15. The computer-implemented method of claim 14, further comprising instantiating and managing multiple systems independently in the multiple pools.

16. The computer-implemented method of claim 15, wherein managing the systems comprises maintaining a workflow for common administrative tasks of the systems.

17. The computer-implemented method of claim 15, wherein the systems are managed through a user interface that provides role-based web-enabled access.

18. A computer program product tangibly embodied in a computer-readable storage medium and comprising instructions that when executed by a processor perform a method for instantiating a solution, the method comprising:

instantiating a system using a preconfigured template comprising a preconfigured system image and a data image, the preconfigured template adapted for use in system instantiation in any of multiple pools isolated from each other, wherein naming and address ranges are managed by a configuration agent, and wherein the preconfigured template comprises configuration information applying to respective ones of multiple layers in the system;

customizing and configuring the system in one of the pools; and allocating and mapping the system to a selection from among physical servers and virtual servers.

\* \* \* \* \*